(12) United States Patent
Worthington

(10) Patent No.: US 11,641,701 B1
(45) Date of Patent: May 2, 2023

(54) ELECTRONIC PROTECTION CIRCUIT

(71) Applicant: Scott Worthington, Flat Rock, IN (US)

(72) Inventor: Scott Worthington, Flat Rock, IN (US)

(73) Assignee: Techniks, LLC, Indianapolis, IN (US)

( * ) Notice: Subject to any disclaimer, the term of this patent is extended or adjusted under 35 U.S.C. 154(b) by 0 days.

(21) Appl. No.: 17/899,943

(22) Filed: Aug. 31, 2022

(51) Int. Cl.
*H05B 6/08* (2006.01)
*H05B 6/14* (2006.01)
*B23B 31/117* (2006.01)

(52) U.S. Cl.
CPC .............. *H05B 6/08* (2013.01); *H05B 6/14* (2013.01); *B23B 31/1179* (2013.01)

(58) Field of Classification Search
CPC .... H05B 6/08; H05B 6/14; H05B 6/06; B23B 3/1179
USPC ....... 219/635, 620, 600, 621, 608, 618, 624, 219/630, 632; 336/15, 65
See application file for complete search history.

(56) References Cited

U.S. PATENT DOCUMENTS

| | | | |
|---|---|---|---|
| 8,415,594 B2 * | 4/2013 | Schilling | H05B 6/062 219/600 |
| 9,370,049 B2 * | 6/2016 | Fishman | H05B 6/067 |
| 9,491,808 B2 * | 11/2016 | Ogasawara | H05B 6/062 |

FOREIGN PATENT DOCUMENTS

JP         2004014492 A   *   1/2004

* cited by examiner

*Primary Examiner* — Quang T Van
(74) *Attorney, Agent, or Firm* — Shuttleworth & Ingersoll, PLC; Jason R. Sytsma

(57) ABSTRACT

A controller is connected to at least one transistor of the transistor driving circuit and connected to the at least one current sensing element to detect the current through the induction heating coil and in response to the current through the at least one current sensing coil exceeding a limit level sending a control signal to the at least one transistor of the transistor driving circuit to temporarily turn off the at least one transistor.

20 Claims, 2 Drawing Sheets

ELECTRONIC PROTECTION CIRCUIT

TECHNICAL FIELD

This invention relates an electric circuit for an induction heat machine for shrink fit tool holders, and, more specifically, this disclosure relates to an electronic protection circuit for the electric circuit for an induction heat machine for shrink fit tool holders.

BACKGROUND INFORMATION

In tool and die manufacturing, induction heating for shrink fit tooling is the leading choice for high-speed machining applications. This process is simple as placing the shank of the cutter tool into the bore of the shrink fit tool holder. The interior diameter of the bore is a little smaller than the diameter of the shank cutting tool. Heating the metal tool holder causes the bore to expand. As the bore grows to a sufficient size, the shank of the tool cutter easily slides into the bore. Thereafter, the tool holder is allowed to cool, the bore shrinks, and a uniform pressure is exerted on the surface of the cutting tool shank. This results in a tremendous gripping strength on the whole surface of the tool shank. Reversing the process allows for the removal of the cutter tool.

Induction heating is a well-known method for producing heat in a localized area on a susceptible metal object. Induction heating involves applying a high frequency AC electric signal to a heating loop placed near a specific location on a piece of metal to be heated. The varying current in the loop creates a varying magnetic flux within the metal to be heated. Current is induced in the metal by the magnetic flux and the internal resistance of the metal causes it to heat up in a relatively short period of time. Induction heaters may be used for many different purposes where fast and reliable heating of metal is necessary or desirable.

Induction heating coils are necessarily inefficient, but it is the inefficiency that results in heat loss used to heat the work pieces. The size of the work piece impacts the efficiency and operation of the induction heating machine. These machines have sophisticated LC circuits that are tuned with a resonant frequency for an average size work piece. The actual work pieces that are heated, however, are rarely the average size. A work piece smaller than the average poses significant risk to the operation of the induction heater.

Accordingly, there is a need for electrical protection circuits for an induction heat machine for shrink fit tool holders.

SUMMARY

In accordance with one aspect of the present invention, disclosed is an electric circuit for an induction heat machine for shrink fit tool holders. The electric circuit comprises of a rectified power source and a transistor driving circuit electrically connected to the rectified power source. A tank capacitor is connected to the transistor driving circuit and in series with an induction heating coil. At least one current sensing coil is connected in parallel across an electrical connection of the rectified power source and the transistor driving circuit. A controller is connected to at least one transistor of the transistor driving circuit and connected to the at least one current sensing element to detect the current through the at least one induction heating coil and in response to the current through the at least one induction heating coil exceeding a limit level sending a control signal to the at least one transistor of the transistor driving circuit to temporarily turn off the at least one transistor.

In an embodiment, the transistor driving circuit is an H-bridge driving circuit with two transistor pairs with a first transistor pair comprising an emitter of a first transistor connected to a collector of a fourth transistor and a second transistor pair comprising an emitter of a second transistor connected to a collector of a third transistor, and wherein the tank capacitor and the induction heating coil are connected in series and between the emitter of the first transistor and the emitter of the second transistor. The rectified power source has an upper rail connected to the collector of the first transistor and the collector of the second transistor and a lower rail connected to the emitter of the fourth transistor and the emitter of the third transistor.

In an embodiment, two current sensing elements are included with a first current sensing element connected in parallel and perpendicular to the electrical connection of the lower rail and the emitter of the fourth transistor and the second current sensing element connected in parallel and perpendicular to the electrical connection of the lower rail and the emitter of the third transistor. The first current sensing element can be connected in perpendicular to the electrical connection of the lower rail and the emitter of the fourth transistor. In such instances, the controller can be connected to the gate of the first transistor and the gate of the third transistor to temporarily turn "off" the first transistor and the second transistor in response to the current through the at least one current sensing element exceeding the limit level. The second current sensing element can be connected in parallel and perpendicular to the electrical connection of the lower rail and the emitter of the third transistor. The controller can be connected to the gate of the second transistor and the gate of the fourth transistor to temporarily turn "off" the second transistor and the fourth transistor in response to the current through the at least one current sensing element exceeding the limit level.

In an embodiment, the first current sensing element is an unshielded, wire-wound axial inductor in parallel and perpendicular with the electrical connection of the lower rail and the emitter of the fourth transistor and the second current sensing element is an unshielded, wire-wound axial inductor in parallel and perpendicular with the electrical connection of the lower rail and the emitter of the third transistor.

In an embodiment, a polarity sensing element can be connected in perpendicular to the electrical current path of the induction heating coil and connected to the controller, so that the controller senses the direction of current flow through the polarity sensing element. The polarity sensing element can be an unshielded, wire-wound axial inductor perpendicularly to the electrical current path of the induction heating coil and connected to the controller.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
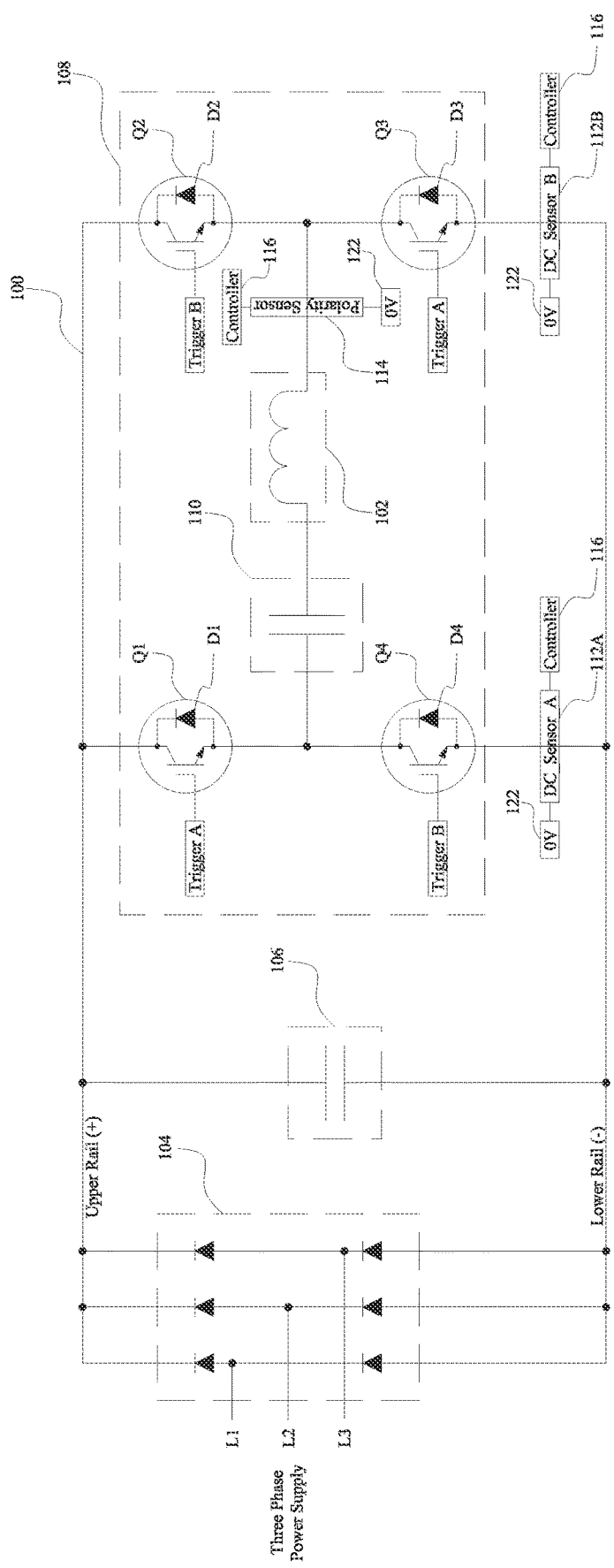
FIG. 1 is an electrical schematic of a inverter circuit according to this disclosure.

Referring to FIG. 1, shown is an inverter circuit 100 for an induction heat machine for shrink fit tool holders according to this disclosure. The induction heater for these machines is characterized as a tubular or annular induction coil or coil 102 formed by a helicoidal winding or several concentric helicoids with rectangular cross-section. Coil 102 is adapted to surround a portion of the tool holder that receives the tool 2 with the height of coil 102 being at least equal to that of the portion of the tool holder. The goal is to maximize the amount of magnetic flux induction from coil 102 to the portion of the tool holder.

According to Faraday's law of induction, a time-varying magnetic field created by an AC current through coil 102, induces electric currents, i.e., "Eddy currents," in the conductor, e.g., the metal tool holder. The magnitude of the Eddy currents is proportional to the strength of the magnetic field created by coil 102. But, according to Lenz's law, these Eddy currents create a magnetic field that opposes the change in the magnetic field that created it. Accordingly, these Eddy currents react back on the magnetic field of coil 102. This means that the larger the tool holder or the metal work piece, the more Eddy currents that are induced and the greater the magnetic field induced thereby to oppose induction. Conversely, the smaller the tool holder or metal work piece, the less opposing induction from the Eddy current, induced magnetic field. Consequently, when smaller work pieces are heated by induction, there is a higher risk that the resonant current into coil 102 will exceed the safe operating current of the circuitry.

When the above principles are applied to induction heating, the changing magnetic field created by coil 102 induces a current in the tool holder and metal work piece. The larger the tool holder or metal work piece, the greater the induced current therein. Heat is induced in the tool holder as a function of the induced current and the resistivity of the material of the tool holder. The magnetic field created by the Eddy currents also induces a current in the coil 102. This induced current in coil 102 is stored in a tank capacitor 110 of the LC circuit as inverter 100 adds more current. Smaller target materials or target materials with higher resistivity will have less current induced, leaving more excess magnetic field to induce back into tank capacitor 110 of the LC circuit.

Inverter circuit 100 comprises of a rectifier 104 connected to a three-phase power supply 103 for providing a modulated AC signal at a desired current. Rectifier 104 may contain necessary circuit elements, such as a transformer, diodes, and a voltage regulator to rectify the AC signal and ensure that the voltage applied to coil 102 is not greater than a predetermined limit.

While inverter circuit 100 can be any type of inverter, including a frequency inverter, in an embodiment, inverter circuit is a phase locked loop inverter that follows the resonance of the LC circuit, described below, and to skip pulses to control the current.

A capacitor 106 across rectifier 104 between an upper rail 105 and lower rail 107 is directly responsive to the total current supplied by rectifier 104. The DC voltage across capacitor 106 is provided as the DC input to inverter circuit 100. Rectifier 104 may be a conventional inverter operable at a natural resonant frequency of the LC circuit comprising tank capacitor 110 and coil 102.

Inverter circuit 100 can further comprise a transistor driving circuit 108 between upper rail 105 and lower rail 107. Transistor driving circuit 108 can take any operable arrangement of transistors, including an H-bridge driving circuit that comprises transistors Q1-Q4. Transistors can also be any type of suitable transistors, including insulated-gate bipolar transistors ("IGBT"). Transistors Q1 and Q3 are turned on and off in unison and transistors Q2 and Q4 are turned on and off in unison. Moreover, whenever transistors Q1 and Q3 are on, transistors Q2 and Q4 will be off. It may be necessary to provide a dead band wherein, before turning on one pair of transistors, the other pair is allowed to turn off. A controller provides the appropriate "on" and "off" signals to the gates of transistors Q1-Q4 to ensure the transistor pairs Q1, Q3 and Q2, Q4 are switched or triggered at the zero-current point where lossless switching is obtained.

Each of transistors Q1-Q4 has a corresponding diode D1-D4 across its collector and emitter to control current flow on alternating AC cycles, which causes current to oscillate back and forth through coil 102.

Coil 102 is matched with tank capacitor 110 to create a resonant coil/capacitor tank circuit (LC circuit) to operate at a pre-selected resonant frequency, preferably around 22.5 kHz. The momentary charging of tank capacitor 110 in turn charges coil 102, which stores the charge in the form of a magnetic field, which in turn induces magnetic flux in the metal of the work piece (e.g., the tool holder being heated). As tank capacitor 110 discharges, coil 102 recharges tank capacitor 110 with an opposite polarity. Once tank capacitor 110 is recharged, it again attempts to empty its charge back across coil 102. This results in an oscillation at the resonant frequency across the LC circuit. Power from rectifier 104 at the operating frequency, however, sustains the oscillation of the LC circuit allowing the continued heating of the work piece.

In a perfectly tuned system, inverter circuit 100 will provide a smooth, continuous heating of the tool holder. In practice, however, each time transistors Q1-Q4 of transistor driving circuit 108 are switched in sync with the resonant current through the LC circuit, more resonant current is supplied to replenish current that has been lost due to heating of the work piece and other parasitic losses. More current is added during each switching cycle of transistors Q1-Q4 than what is consumed by the work piece in the form of heating. This can cause the resonant current through transistors Q1-Q4 to increases until the maximum current threshold is exceeded, thus destroying transistors Q1-Q4. Therefore, sensing and protection elements are required.

To limit the resonant current through transistors Q1-Q4, current sensing is used to determine when transistors Q1-Q4 should stop/start switching while maintaining lossless zero current switching. This can be achieved by keeping transistor Q4 and tank capacitor 110 connected to the lower rail and transistor Q2 and coil 102 connected to the upper rail despite the timing of the resonant current when the current limit is reached. This allows the resonant current to continue flowing through the freewheeling diodes D4, D2 without supplying more current in resonance. When the current is below the current limit, transistor switching continues to add more current. Inverter circuit 100 can be improved by also keeping transistor Q3 and tank capacitor 110 connected to the lower rail and transistor Q1 and coil 102 connected to the upper rail during its half-cycle.

As previously described, the preferred resonant frequency of the LC network (tank capacitor 110 and coil 102) is around 22.5 kHz. This means that each half cycle is only 0.000022 seconds or 22 microseconds. A current sensing and logic circuit (shown in FIG. 2) is provided that is responsive to inhibit the sourcing of more current from rectifier 104 within just over one half cycle when the work piece (e.g. tool holder and/or tool) is "small." As described above, smaller work pieces induce less magnetic induction to oppose the magnetic field created by coil 102, which allows the resonant current through transistors Q1-Q4 of transistor driving circuit 108 to rapidly increase beyond their safe operating range. When this occurs, there is a risk of transistor "shoot through."

Shoot through occurs when the current passing through the transistors is so high that the control voltage to the transistor cannot shut the transistors down. So, for example, a short circuit between transistors Q1, Q4 or Q2, Q3, will destroy the transistors, unless the transistors can be turned off. Even a direct short does not increase current infinitely fast. If the overcurrent event is caught within 2 microseconds the transistors can still be shutdown.

At least one sensor 120 is provided to sense the current through at least one-phase of transistor driving circuit 108. FIG. 1 illustrates two sensors 120a, 120b to sense the current through both phase of transistor driving circuit 108. Sensor 120 is preferably a passive element that is in perpendicular to the current flow and electrically isolated from transistor driving circuit 108 during normal operating currents. In an embodiment, sensor 120 comprises of a unshielded, wire-wound axial inductor placed perpendicularly to the circuit path across lower rail 107. Such a wire-wound inductor can be a RF choke, such as a 100 mH RF choke with a ferrite core.

There can be two layers of current protection, a DC current limit and a DC over current. The DC current limit is an adjustable setting that keeps transistor driving circuit 108 under control by skipping pulses to the LC circuit (tank capacitor 110 and coil 102). While transistors Q2, Q4 are conducting, if the current sensed by sensor 120a exceeds the DC current limit, controller 116 will keep transistors Q2, Q4 off for the next half-cycle. It does not interrupt the current half-cycle to protect the transistors Q2, Q4 from being turned off mid-cycle. The current then oscillates back and forth through transistors Q2, Q4 and through diodes D2, D4 until the DC current drops below the current limit to allow the resonant current oscillating through the LC circuit (i.e., coil 102 and tank capacitor 110) to dissipate. Once the current no longer exceeds the current limit during a positive swing of the cycle, controller 116 removes the inhibit from transistors Q1, Q3 to allow transistor driving circuit 108 to resume normal operation.

The DC over current protection is a threshold level that is set to prevent a complete failure of one or more transistors Q1-Q4. In one embodiment, it is set at an integer multiple of the DC current limit. Once either sensor 120a or sensor 120b senses a current above the DC over current threshold level, controller 116 immediately turns off the transistors Q1-Q4 of transistor driving circuit 108. Controller 116 can require a complete power down reset before resuming normal operation.

A polarity sensor 114 is also provided to ensure that transistor pairs Q1, Q3 and Q2, Q4 switch in synchronization to time the switching with the natural resonance of the LC circuit. In an embodiment, polarity sensor 114 comprises of an unshielded, wire-wound axial inductor placed perpendicularly to and electrically isolated from the circuit path between the emitters of transistors Q2, Q3 and coil 102. The wire-wound inductor can be an RF choke, such as a 100 mH RF with a ferrite core. The current passing through the circuit path to coil 102 creates a magnetic field that induces a current in polarity sensor 114. The direction of the current flow relates to the polarity which relates to which of transistor pairs Q1, Q3 and Q2, Q4 is "on." When the current through the circuit reverses, the current also reverses through the polarity sensor 114.

Figure 2:
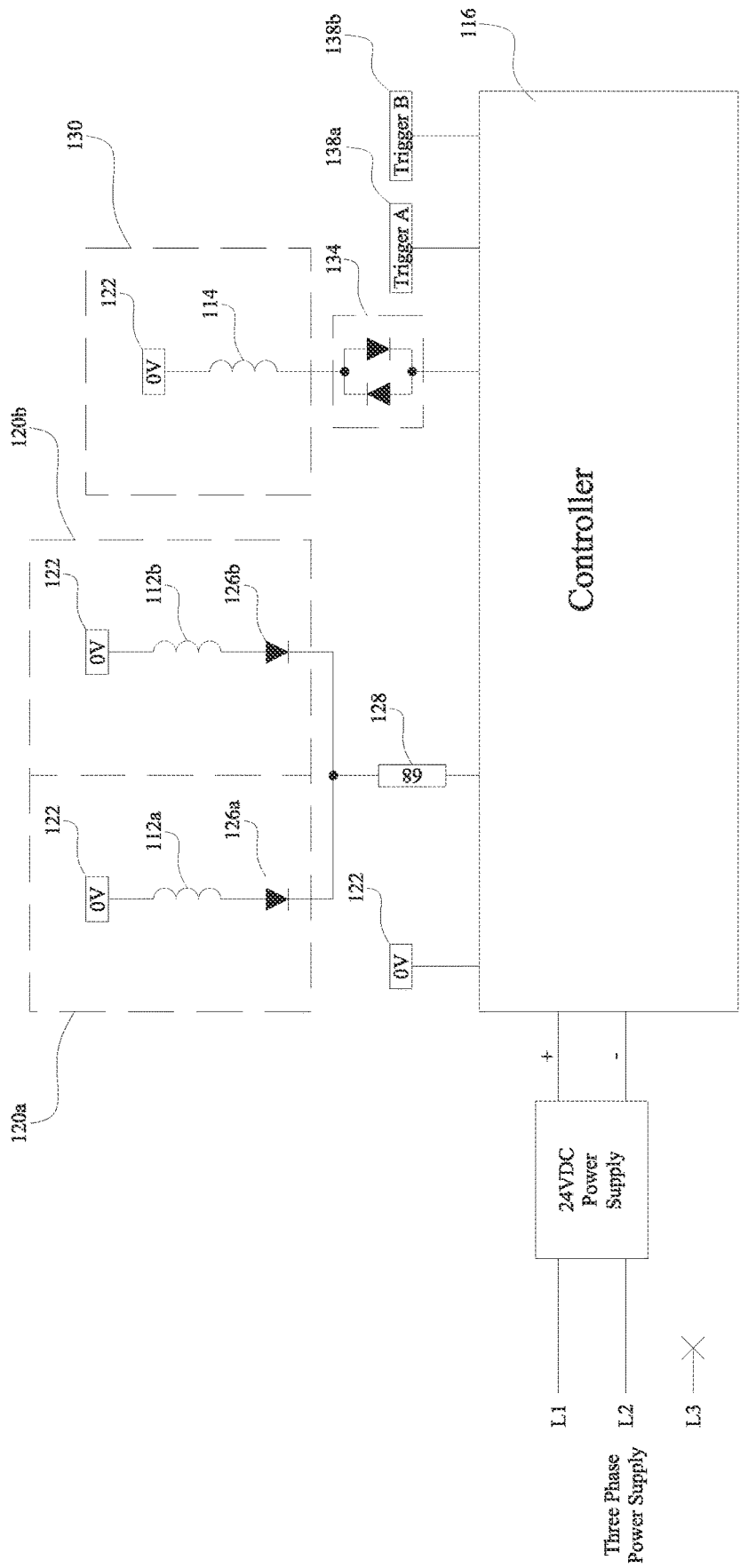
FIG. 2 shows a schematic of the controller for controlling the transistors of the inverter circuit of FIG. 1.

FIG. 2 shows controller 116 for monitoring the current through sensor 120a and sensor 120b and polarity sensor 114. Controller 116 senses the amount of current flow through sensor 120a and sensor 120b. As described above, for DC current limit, when the current exceeds the DC current limit, controller 116 will turn "off" transistors Q1 and Q3 and keep "on" transistors Q2 and Q4 or vice versa until the current measured on the last cycle is below the DC current limit to allow the resonant current oscillating through the LC circuit (i.e., coil 102 and tank capacitor 110) to dissipate. Essentially, controller 116 manipulates transistor pairs of transistor driving circuit 108 to "skip" current pulses to reduce the amount of current fed into tank capacitor 110 until the current dissipates below the current limit. After the resonant current has dissipated, controller 116 resumes the on/off operation of transistor pairs Q1, Q3 and Q2, Q4 to oscillate the current through coil 102.

Sensor 120a and sensor 120b each comprise an inductor 112a and an inductor 112b, respectively, which are connected perpendicularly and electrically isolated from the current path between lower rail 107 and transistor driving circuit 108. A 0V reference voltage 122 is connected to one end of each of inductor 112a and inductor 112b. The other end of each inductor 112a and inductor 112b is connected to an anode of a corresponding diode 126a, 126b to block the current flow in an opposite direction. The cathode of each diode 126a, 126b is connected to a resistor 128. Resistor 128 is used to adjust the current reading from the sensors to a voltage value that represents the current. In an embodiment, resistor 128 is 68 ohms, which means 100A passing by the respective sensor 120a and sensor 120b relates to 1V seen by controller 116. Diodes 126a, 126b prevent the current being generated by one sensor from being directed to the other sensor and ensures positive signals. Other orientations of the diodes 126 and sensors 120 can provide both negative signals from the sensors or one sensor provides positive, while the other provides negative signals.

When the voltage exceeds a limit value, controller 116 turns off the respective transistor pairs Q1, Q3 and Q2, Q4 for the next half-cycle with a trigger signal from the respective outputs 138a, 138b of controller 116 which are connected to the gates of transistor pairs Q1, Q3 and Q2, Q4, respectively.

Controller 116 also senses the polarity of the current with polarity sensor 114 to control the on/off timing of transistor pairs Q1, Q3 and Q2, Q4 to prevent transistors Q1, Q4 or Q2, Q3 from being on at the same time and creating a shoot through event. Polarity sensor 114 is connected to 0V reference voltage 122 at one end and to controller 116 at the other. Polarity sensor 114 can comprise inductor 130, as described above, connected to a pair of opposing diodes 134 to clip the signal from RC sensor to less than 1V AC for fast transition between positive and negative signals. The output of the pair of opposing diodes 134 is connected to controller 116 for it to sense the polarity of the signal.

Controller 116 can be implemented as analog or digital logic gates, chips or circuitry. Functionality may programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs), all of which can be considered as controller 116. Some other possibilities for implementing aspects of the systems and methods include: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. An electric circuit for an induction heat machine for shrink fit tool holders, the electric circuit comprising:
   a rectified power source;
   a transistor driving circuit electrically connected to the rectified power source;
   a tank capacitor connected to the transistor driving circuit;
   an induction heating coil connected in series with the tank capacitor and connected to the transistor driving circuit;
   at least one sensor connected perpendicularly across an electrical connection of the rectified power source and the transistor driving circuit and electrically isolated therefrom; and
   a controller connected to at least one transistor of the transistor driving circuit and connected to the at least one sensor to detect a current through the induction heating coil, and in response to the current through the at least one sensor exceeding a current limit level sending a control signal to the at least one transistor of the transistor driving circuit to temporarily turn off the at least one transistor.

2. The electric circuit of claim 1, wherein the transistor driving circuit is an H-bridge driving circuit with two transistor pairs with a first transistor pair comprising an emitter of a first transistor connected to a collector of a fourth transistor and a second transistor pair comprising an emitter of a second transistor connected to a collector of a third transistor, and wherein the tank capacitor and the induction heating coil are connected in series and between the emitter of the first transistor and the emitter of the second transistor.

3. The electric circuit of claim 2, wherein the rectified power source has an upper rail connected to the collector of the first transistor and the collector of the second transistor and a lower rail connected to the emitter of the fourth transistor and the emitter of the third transistor.

4. The electric circuit of claim 3, wherein the at least one sensor is connected perpendicularly to the electrical connection of the lower rail and the emitter of the fourth transistor and electrically isolated therefrom or connected perpendicularly to the electrical connection of the lower rail and the emitter of the third transistor and electrically isolated therefrom.

5. The electrical circuit of claim 4, wherein the at least one sensor is connected perpendicularly across the electrical connection of the lower rail and the emitter of the fourth transistor, and wherein the controller is connected to a gate of the first transistor and a gate of the third transistor to temporarily turn "off" the first transistor and the third transistor in response to the current through the at least one sensor exceeding the limit level and to turn "off" the first transistor and the third transistor in response to the current through the at least one sensor exceeding a current threshold level.

6. The electrical circuit of claim 4, wherein the at least one sensor is connected perpendicularly to the electrical connection of the lower rail and the emitter of the third transistor, and wherein the controller is connected to a gate of the second transistor and a gate of the fourth transistor to turn "off" the second transistor and the fourth transistor in response to the current through the at least sensor exceeding a current threshold level.

7. The electrical circuit of claim 4, and further comprising two current sensing elements with a first current sensing element connected perpendicularly to the electrical connection of the lower rail and the emitter of the fourth transistor and a second current sensing element connected perpendicularly to the electrical connection of the lower rail and the emitter of the third transistor.

8. The electrical circuit of claim 7, wherein the first current sensing element is connected perpendicularly to the electrical connection of the lower rail and the emitter of the fourth transistor, and wherein the controller is connected to a gate of the first transistor and a gate of the third transistor to temporarily turn "off" the first transistor and the third transistor in response to the current through the at least one sensor exceeding the limit level, and wherein the second current sensing element is connected perpendicularly to the electrical connection of the lower rail and the emitter of the third transistor, and wherein the controller is connected to a gate of the second transistor and a gate of the fourth transistor to turn "off" the second transistor and the fourth transistor in response to the current through the at least one sensor exceeding a current threshold level.

9. The electrical circuit of claim 8, and further comprising a polarity sensing element connected perpendicularly to the electrical connection of the induction heating coil and the emitter of the second transistor and connected to the controller.

10. The electrical circuit of claim 9, wherein the controller senses a direction of current flow through the polarity sensing element.

11. The electrical circuit of claim 10, wherein the polarity sensing element is an unshielded, wire-wound axial inductor perpendicular to the electrical connection of the induction heating coil and the emitter of the second transistor and connected to the controller.

12. The electrical circuit of claim 11, wherein the first current sensing element is an unshielded, wire-wound axial inductor perpendicular to the electrical connection of the lower rail and the emitter of the fourth transistor, and wherein the second current sensing element is an unshielded, wire-wound axial inductor perpendicular with the electrical connection of the lower rail and the emitter of the third transistor and electrically isolated therefrom.

13. The electrical circuit of claim 1, and further comprising a first 0V reference signal connected to a first sensor; and a second 0V reference signal connected to a second sensor.

14. The electrical circuit of claim 13, wherein an output of the first sensor is connected to a first diode and an output of the second sensor is connected to a second diode.

15. The electrical circuit of claim 14, wherein an output of the first diode and an output of the second diode are connected to a resistor in series with an input of the controller wherein a voltage across the resistor corresponds to a current sensed by the respective first sensor and the second sensor.

16. The electrical circuit of claim 15, wherein the controller is connected to a gate of a first transistor and a gate of a third transistor to temporarily turn "off" the first transistor and the third transistor in response to the current sensed by the first sensor exceeding a current limit level; and wherein the controller is connected to a gate of a second transistor and a gate of a fourth transistor, wherein the transistor driving circuit is turned "off" in response to a current exceeding a current threshold level in any one of the two transistor pairs.

17. The electrical circuit of claim 16, wherein the current threshold level is greater than the current limit level.

18. A method of controlling an induction heat machine for a shrink fit tool holder, the method comprising:
providing a rectified power source;
providing a transistor driving circuit electrically connected to the rectified power source;
providing a tank capacitor connected to the transistor driving circuit;
providing an induction heating coil connected in series with the tank capacitor and connected to the transistor driving circuit;
sensing with at least one current sensing coil connected perpendicularly across an electrical connection of the rectified power source and the transistor driving circuit and electrically isolated therefrom; and
sending a control signal from a controller to the at least one transistor of the transistor driving circuit to temporarily turn off the at least one transistor in response to a current through the at least one current sensing element exceeding a current limit level.

19. The method of claim 18, wherein the transistor driving circuit is an H-bridge driving circuit with two transistor pairs with a first transistor pair comprising an emitter of a first transistor connected to a collector of a fourth transistor and a second transistor pair comprising an emitter of a second transistor connected to a collector of a third transistor, and wherein the tank capacitor and the induction heating coil are connected in series and between the emitter of the first transistor and the emitter of the second transistor; wherein the rectified power source has an upper rail connected to the collector of the first transistor and the collector of the second transistor and a lower rail connected to the emitter of the fourth transistor and the emitter of the third transistor; wherein the at least one current sensing element is connected perpendicularly to the electrical connection of the lower rail and the emitter of the fourth transistor; and the method further comprising turning "off" the first transistor and the third transistor in response to the current through the at least one current sensing element exceeding the current limit level; and turning "off" the first transistor and the third transistor in response to the current through the at least one current sensing element exceeding a current threshold level; wherein the current threshold level is greater than the current limit level.

20. The method of claim 19, and further comprising: sensing a polarity of the current flow with a polarity sensing element connected perpendicularly to the electrical connection of the induction heating coil and the emitter of the second transistor and connected to the controller.

\* \* \* \* \*